United States Patent
Gibson et al.

(10) Patent No.: US 9,115,682 B2
(45) Date of Patent: *Aug. 25, 2015

(54) METHODS AND SYSTEMS FOR OPERATING A DRIVELINE DISCONNECT CLUTCH

(71) Applicant: Ford Global Technologies, LLC, Dearborn, MI (US)

(72) Inventors: Alexander O'Connor Gibson, Ann Arbor, MI (US); Felix Nedorezov, Rochester Hills, MI (US); Jeffrey Allen Doering, Canton, MI (US); Hong Jiang, Birmingham, MI (US); Seung-Hoon Lee, Northville, MI (US); James William Loch McCallum, Ann Arbor, MI (US); Gregory Michael Pietron, Canton, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/061,291

(22) Filed: Oct. 23, 2013

(65) Prior Publication Data

US 2014/0046529 A1    Feb. 13, 2014

Related U.S. Application Data

(63) Continuation-in-part of application No. 13/776,347, filed on Feb. 25, 2013.

(60) Provisional application No. 61/643,137, filed on May 4, 2012.

(51) Int. Cl.
    *B60W 10/02*    (2006.01)
    *F02N 11/00*    (2006.01)
    (Continued)

(52) U.S. Cl.
    CPC . *F02N 11/00* (2013.01); *B60K 6/48* (2013.01); *B60W 10/02* (2013.01); *B60W 10/026* (2013.01);
    (Continued)

(58) Field of Classification Search
    CPC ....... F02N 11/00; Y02T 10/6221; B60K 6/48; B60Y 2400/426; B60Y 2300/18083; B60Y 2200/92; B60Y 2300/49; Y10S 903/902; B60W 10/02; B60W 10/026; B60W 30/20; B60W 2030/206; B60W 2510/1015; B60W 2710/081; B60W 20/40
    USPC ............. 701/22; 477/3, 5; 180/65.265, 65.28, 180/65.285
    See application file for complete search history.

(56) References Cited

U.S. PATENT DOCUMENTS

| 4,708,030 | A  | 11/1987 | Cordner |
| 6,599,214 | B2 | 7/2003  | Swales  |

(Continued)

FOREIGN PATENT DOCUMENTS

| EP | 1582737 A2 | 3/2005 |
| GB | 2468906 A1 | 9/2010 |

*Primary Examiner* — Richard Camby
(74) *Attorney, Agent, or Firm* — David Kelley; Alleman Hall McCoy Russell & Tuttle LLP

(57) ABSTRACT

Systems and methods for improving operation of a hybrid vehicle are presented. In one example, application of a driveline disconnect clutch to start an engine is described. The approach applies the driveline disconnect clutch to rotate an engine and at least partially disengages the driveline disconnect clutch to reduce the possibility of a reduction in torque applied to vehicle wheels.

20 Claims, 5 Drawing Sheets

(51) Int. Cl.
  *B60K 6/48* (2007.10)
  *B60W 30/20* (2006.01)
  *B60W 20/00* (2006.01)

(52) U.S. Cl.
  CPC .............. *B60W 20/40* (2013.01); *B60W 30/20* (2013.01); *B60W 2030/206* (2013.01); *B60W 2510/1015* (2013.01); *B60W 2710/027* (2013.01); *B60W 2710/081* (2013.01); *B60Y 2200/92* (2013.01); *B60Y 2300/18083* (2013.01); *B60Y 2300/49* (2013.01); *B60Y 2400/426* (2013.01); *Y02T 10/6221* (2013.01); *Y10S 903/902* (2013.01); *Y10T 477/71* (2015.01)

(56) References Cited

U.S. PATENT DOCUMENTS

| | | | |
|---|---|---|---|
| 6,821,223 | B2 | 11/2004 | Henry |
| 7,021,409 | B2 | 4/2006 | Tamor |
| 7,828,096 | B2 * | 11/2010 | Hoher et al. ............... 180/65.6 |
| 8,036,815 | B2 | 10/2011 | Okumoto et al. |
| 8,152,682 | B2 | 4/2012 | Swales et al. |
| 8,840,523 | B2 * | 9/2014 | Tajima ............................... 477/5 |
| 2002/0111239 | A1 | 8/2002 | Swales |
| 2009/0312144 | A1 | 12/2009 | Allgaier et al. |
| 2010/0299053 | A1 | 11/2010 | Okumoto et al. |
| 2011/0056450 | A1 | 3/2011 | Notani |
| 2011/0137544 | A1 | 6/2011 | Kawazu et al. |
| 2011/0172901 | A1 | 7/2011 | Okumoto et al. |
| 2012/0083385 | A1 | 4/2012 | Smith et al. |
| 2012/0083952 | A1 | 4/2012 | Smith et al. |
| 2012/0178585 | A1 * | 7/2012 | Schoenek et al. ................. 477/5 |
| 2013/0291830 | A1 | 11/2013 | Doering et al. |
| 2013/0292195 | A1 | 11/2013 | Gibson et al. |
| 2013/0296098 | A1 | 11/2013 | Gibson et al. |
| 2013/0296102 | A1 | 11/2013 | Banker et al. |
| 2013/0296118 | A1 | 11/2013 | Pietron et al. |
| 2013/0296119 | A1 | 11/2013 | Reed et al. |
| 2013/0296120 | A1 | 11/2013 | Reed et al. |
| 2013/0296121 | A1 | 11/2013 | Gibson et al. |
| 2013/0296122 | A1 | 11/2013 | Banker et al. |
| 2013/0296123 | A1 | 11/2013 | Doering et al. |
| 2013/0296124 | A1 | 11/2013 | Pietron et al. |
| 2013/0296125 | A1 | 11/2013 | Gibson et al. |
| 2013/0296126 | A1 | 11/2013 | Gibson et al. |
| 2013/0296130 | A1 | 11/2013 | Banker et al. |
| 2013/0296132 | A1 | 11/2013 | Doering et al. |
| 2013/0296136 | A1 | 11/2013 | Doering et al. |
| 2013/0297114 | A1 | 11/2013 | Doering et al. |
| 2013/0297115 | A1 | 11/2013 | Doering et al. |
| 2013/0297116 | A1 | 11/2013 | Reed et al. |
| 2013/0297117 | A1 | 11/2013 | Lee et al. |
| 2013/0297118 | A1 | 11/2013 | Reed et al. |
| 2013/0297119 | A1 | 11/2013 | Reed et al. |
| 2013/0297120 | A1 | 11/2013 | Reed et al. |
| 2013/0297121 | A1 | 11/2013 | Reed et al. |
| 2013/0297122 | A1 | 11/2013 | Gibson et al. |
| 2013/0297123 | A1 | 11/2013 | Gibson et al. |
| 2013/0297157 | A1 | 11/2013 | Pietron et al. |
| 2013/0297161 | A1 | 11/2013 | Gibson et al. |
| 2013/0297187 | A1 | 11/2013 | Doering et al. |
| 2014/0148983 | A1 * | 5/2014 | Kim ................................. 701/22 |
| 2014/0163793 | A1 * | 6/2014 | Kim et al. ....................... 701/22 |

* cited by examiner

METHODS AND SYSTEMS FOR OPERATING A DRIVELINE DISCONNECT CLUTCH

CROSS REFERENCE TO RELATED APPLICATIONS

The present application is a continuation-in-part to U.S. patent application Ser. No. 13/776,347 filed on Feb. 25, 2013, which claims priority to U.S. Provisional Patent Application 61/643,137 filed on May 4, 2012, the entire contents of each of which are hereby incorporated by reference for all purposes.

FIELD

The present description relates to a system and methods for improving drivability and fuel economy of a vehicle. The methods may be particularly useful for engines that are selectively coupled to an electrical machine and a transmission.

BACKGROUND AND SUMMARY

Some hybrid vehicles may include a driveline disconnect clutch that may mechanically isolate one portion of a driveline from a second portion of the driveline. In one hybrid configuration, the driveline disconnect clutch may isolate an engine from an electric motor if the driveline disconnect clutch is in an open state. The driveline disconnect clutch mechanically couples the engine to the motor when the driveline disconnect clutch is in a closed state. The driveline disconnect clutch may also be partially closed so that the electric motor rotates the engine during engine starting. However, it may be difficult to maintain torque applied to vehicle wheels when the driveline disconnect clutch is partially engaged because the driveline disconnect clutch torque may be difficult to estimate. Consequently, a torque reduction to the vehicle wheels may occur during engine starting.

The inventors herein have recognized the above-mentioned disadvantages and have developed a method of operating a hybrid vehicle driveline, comprising: automatically stopping an engine and opening a driveline disconnect clutch in response to an engine stop request; and automatically starting the engine in response to an engine start request, automatically starting the engine includes partially closing the driveline disconnect clutch to rotate the engine at a cranking speed and at least partially opening the driveline disconnect clutch in response to an combustion event.

By partially closing a driveline disconnect clutch to crank an engine and at least partially opening the driveline disconnect clutch in response to a combustion event or other engine rotation related event, it may be possible to provide the technical result of maintaining torque applied to vehicle wheels during engine starting. At least partially opening the driveline disconnect clutch after a combustion event may reduce the amount of torque transferred from a driveline integrated starter generator to the engine being started. Further, the amount of time torque is transferred from the driveline integrated starter generator to the engine may be reduced so that the effect of any disconnect clutch torque estimation error may be reduced. Additionally, timing of opening the driveline disconnect clutch is made uniform between engine starts so that the vehicle operates in a similar way between different engine starts.

The present description may provide several advantages. Specifically, the approach may reduce driveline torque disturbances of a hybrid driveline. Further, the approach may improve vehicle drivability. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
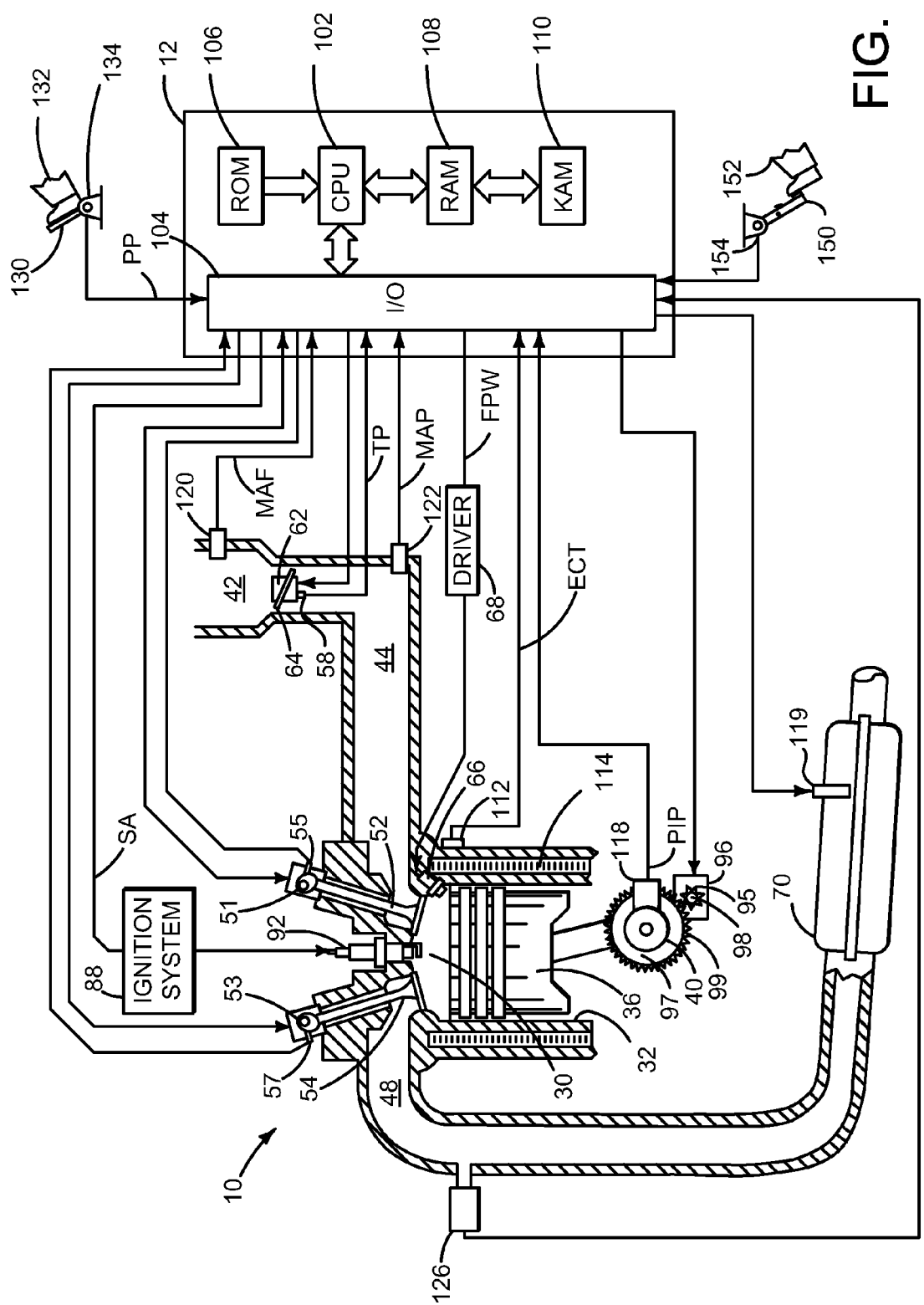
FIG. 1 is a schematic diagram of an engine.
Figure 2:
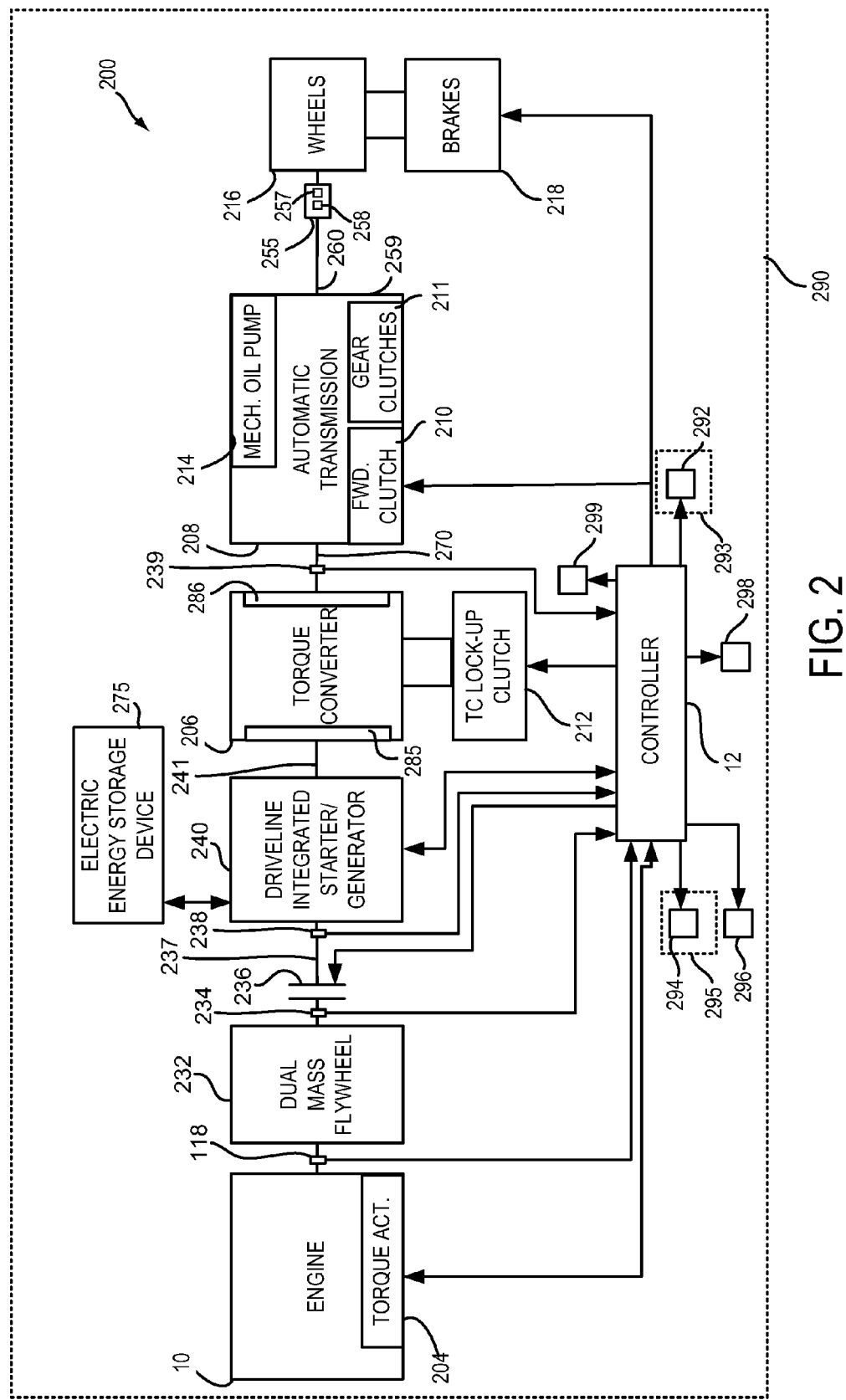
FIG. 2 shows a first example vehicle driveline configuration.
Figure 3:
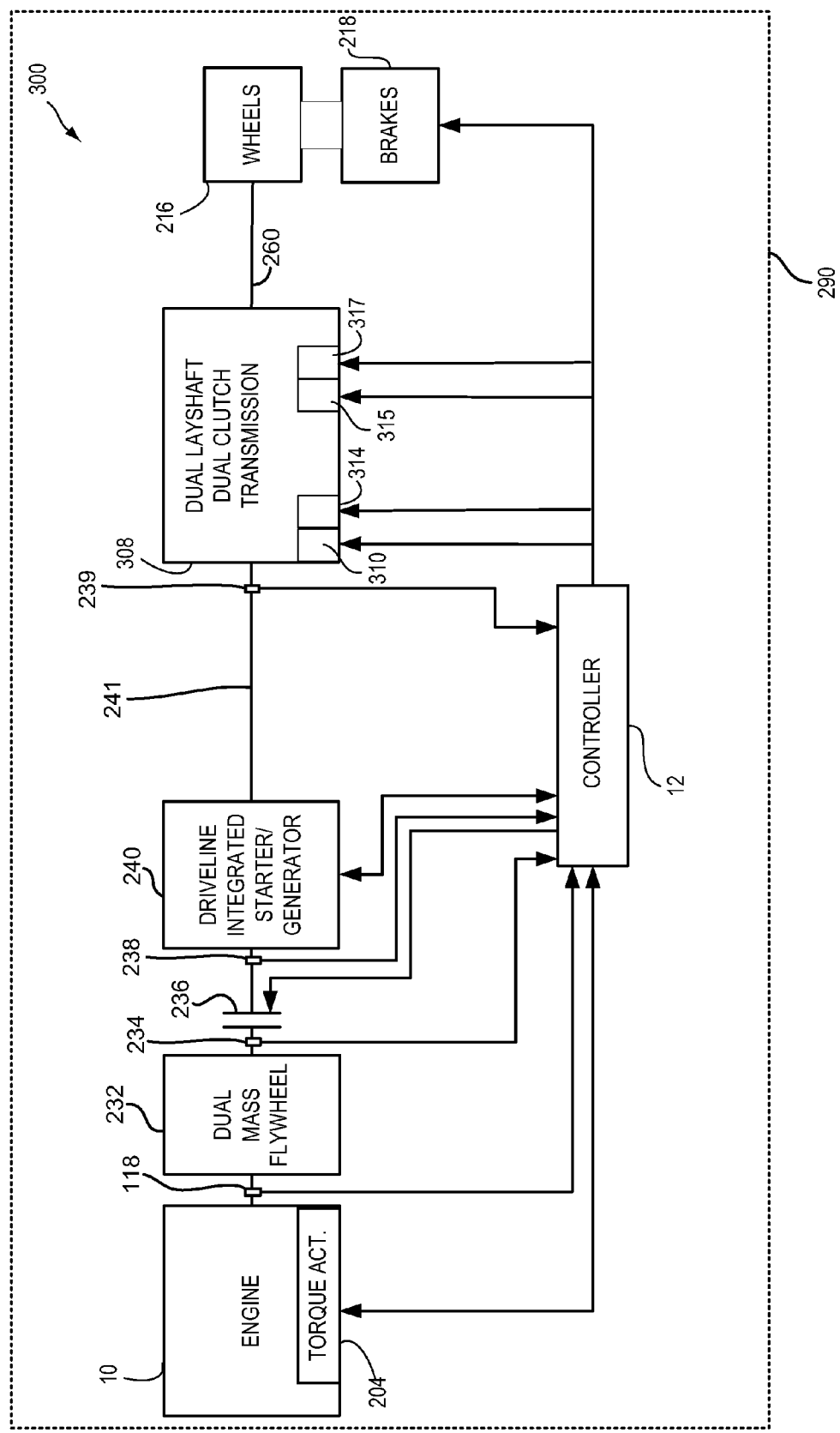
FIG. 3 shows a second example vehicle driveline configuration.

The present description is related to controlling a driveline of a hybrid vehicle. The hybrid vehicle may include an engine and electric machine as shown in FIGS. 1-3. The engine may be operated with or without a driveline integrated starter/generator (e.g., an electric machine or motor that may be abbreviated DISG) during vehicle operation. The driveline integrated starter/generator is integrated into the driveline on the same axis as the engine crankshaft and rotates whenever the torque converter impeller rotates. Further, the DISG may not be selectively engaged or disengaged with the driveline. Rather, the DISG is an integral part of the driveline. The DISG may be used to start the engine according to the method of FIG. 4. FIG. 5 shows an example sequence of starting the engine via the DISG according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. Starter 96 may be described as a lower power starting device. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53.

The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst, a particulate filter, a lean NOx trap, selective reduction catalyst, or other emissions control device. An emissions device heater 119 may also be positioned in the exhaust system to heat converter 70 and/or exhaust gases.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force and/or position applied by foot 132; a position sensor 154 coupled to brake pedal 150 for sensing force and/or position applied by foot 152; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2 and 3. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 in vehicle 290. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of driveline disconnect clutch 236. Driveline disconnect clutch 236 may be electrically or hydraulically actuated. A position sensor 234 is positioned on the driveline disconnect clutch side of dual mass flywheel 232 to sense the output position and speed of the dual mass flywheel 232. In some examples, position sensor 234 may include a torque sensor. The downstream side of driveline disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a power output than that is greater than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200.

Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the driveline disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter impeller speed and position may be determined via sensor 238. Torque converter turbine speed and position may be determined via position sensor 239. In some examples, 238 and/or 239 may be torque sensors or may be combination position and torque sensors.

When torque converter clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter clutch 212 is fully engaged, the engine output torque is directly transferred via the torque converter clutch to an input shaft 270 of transmission 208. Alternatively, the torque converter clutch 212 may be partially engaged, thereby enabling the amount of torque directly relayed to the transmission to be adjusted. The controller 12 may be configured to adjust the amount of torque transmitted by torque converter 206 by adjusting the torque converter clutch 212 in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Output shaft 260 delivers torque from transmission 308 to wheels 216 via differential 255 which includes first gear 257 and second gear 258. Automatic transmission 208 may transfer an input driving torque at the input shaft 270 responsive to a vehicle traveling condition before transmitting an output driving torque to the wheels 216.

Further, a frictional force may be applied to wheels 216 by engaging wheel friction brakes 218. In one example, wheel friction brakes 218 may be engaged in response to the driver pressing his foot on a brake pedal (not shown). In other examples, controller 12 or a controller linked to controller 12 may apply engage wheel friction brakes. In the same way, a frictional force may be reduced to wheels 216 by disengaging wheel friction brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from DISG windings as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle frame as described in U.S. patent application Ser. No. 12/833,788 "METHOD FOR CONTROLLING AN ENGINE THAT MAY BE AUTOMATICALLY STOPPED" which is hereby fully incorporated by reference for all intents and purposes. A transmission clutch pressure may be varied (e.g., increased) to adjust the engagement state of a transmission clutch, and provide a desired amount of transmission torsion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When restart conditions are satisfied, and/or a vehicle operator wants to launch the vehicle, controller 12 may reactivate the engine by resuming combustion in cylinders. The engine may be started in a variety of ways.

Vehicle 290 may also include front 294 and rear 292 windscreen heaters. Windscreen heaters 294 and 292 may be electrically operated and embedded within or coupled to the vehicle's front and rear windscreens 295 and 293. Vehicle 290 may also include lights 296, which may or may not be visible to the driver while the driver is operating vehicle 290. Vehicle 290 may also include an electrically operated fuel pump 299 that supplies fuel to engine 10 during selected conditions. Finally, vehicle 290 may include an electric heater 298 that selectively supplies heat to air in a vehicle cabin or ambient air outside vehicle 290.

Referring now to FIG. 3, a second example vehicle driveline configuration is shown. Many of the elements in driveline 300 are similar to the elements of driveline 200 and use equivalent numbers. Therefore, for the sake of brevity, the description of elements that are common between FIG. 2 and FIG. 3 is omitted. The description of FIG. 3 is limited to elements that are different from the elements of FIG. 2.

Driveline 300 includes a dual clutch-dual layshaft transmission 308. Transmission 308 is essentially an automatically operated manual transmission. Controller 12 operates first clutch 310, second clutch 314, and shifting mechanism 315 to select between gears (e.g., $1^{st}$-$5^{th}$ gears) 317. First clutch 310 and second clutch 314 may be selectively opened and closed to shift between gears 317.

The systems of FIG. 1-3 may include torque sensors that may be the basis for adjusting driveline operation. Alternatively, the torque converter itself may be used as the torque sensor when the torque converter clutch 212 is fully disengaged. Specifically, the torque output of an open torque converter is a function of the input and output speeds, the impeller and turbine speeds where the impeller in the torque converter input and the turbine the torque converter output. In the application of FIGS. 2/3, the impeller speed is equal to the measured DISG speed, as the DISG rotor output shaft is the impeller input shaft and the turbine speed is measured and used in the control of the transmission clutch control.

Additionally, given an input and output speed characterization of the open torque converter, the torque output of the open torque converter can be controlled by controlling the torque converter impeller speed as a function of the torque converter turbine speed. The DISG may be operated in speed feedback mode to control torque converter torque. For example, the commanded DISG speed (e.g., same as torque converter impeller speed) is a function of the torque converter turbine speed. The commanded DISG speed may be determined as a function of both the DISG speed and the turbine speed to deliver the desired torque at the torque converter output.

Drive line disturbances in the systems of FIGS. 1-3 may also be reduced via the driveline disconnect clutch. One example approach opens the torque converter clutch prior to actuating the driveline disconnect clutch. For example, the driveline disconnect clutch may be opened when the engine is commanded to shutdown, either during a vehicle regenerative braking condition and/or when the vehicle comes to a stop and the engine is shutdown.

In another example, during regenerative braking, the driveline disconnect clutch may be open, the engine may be stopped, and the torque converter may be locked in order to increase the braking torque that can be absorbed in the DISG 240. After the engine is shutdown, the driveline disconnect clutch remains open until the beginning of the engine restart process. During the engine restart, the driveline disconnect clutch may be partially closed to crank the engine until the first combustion event in a cylinder. Alternatively, the driveline disconnect clutch may be partially closed until the engine reaches a predetermined speed after combustion in a cylinder is initiated. Once the engine combustion is sufficiently restarted and the engine and driveline disconnect clutch speed are sufficiently close (e.g., within a threshold RPM value), the driveline disconnect clutch capacity is ramped up to close and hold without slip. During driveline disconnect clutch ramping, torque disturbances at the driveline disconnect clutch output may be present. Consequently, torque feedback from the open torque converter or a torque sensor may be the basis for adjusting a DISG speed setting. Operating the DISG in speed control mode may allow desired torque values to be maintained with more consistency until the driveline disconnect clutch is fully closed. After the driveline disconnect clutch is closed, the torque converter clutch (TCC) may be locked based on a lock-up schedule (e.g., TCC may be actuated based on accelerator pedal position and vehicle speed).

In this way, the torque converter clutch may be fully opened prior to the beginning of the engine restart process. The torque converter clutch may be closed after the engine has restarted and the driveline disconnect clutch has fully closed. Additionally, while the driveline disconnect clutch is being closed, pressure to the driveline disconnect clutch is known (as it is being commanded by the controller) and thereby an estimate of the average driveline disconnect clutch torque is available. To further enhance the operation, this estimate of the driveline disconnect clutch torque, or capacity, can be used by the controller as a feed-forward input to the DISG feedback speed control to improve the disturbance rejection response. The driveline disconnect clutch capacity which is based on a torque estimate may then be added as an input to an inner torque feedback loop in the electric machine (DISG). The inner loop is an inner current loop which may be the basis for improving the response of the DISG when the DISG is in speed feedback mode.

In this way, one example approach for operating a vehicle having a powertrain, such as the powertrain described with regard to FIGS. 2-3, includes first operating with the vehicle stopped or with a speed below a threshold, and with the engine at rest and the driveline disconnect clutch open. Next, with the torque converter fully unlocked, the method includes receiving a request to launch the vehicle, such as based on an operator pedal input increasing past a threshold amount. In response, the engine is cranked and started with one or more of the DISG 240 and a starter motor while the driveline disconnect clutch is closed, again with the torque converter still unlocked. During this operation, torque feedback from the torque converter input/output speeds is used to estimate the torque at shaft 241, which is compared with a desired torque value and it provides adjustment to a speed setting of the DISG 240, which is in speed control mode. For example, the speed setting may be an adjustment parameter that drives torque error between estimated and desired torque at shaft 241 toward zero.

Thus, the system of FIGS. 1-3 provides for a hybrid vehicle driveline system, comprising: a torque converter; a driveline integrated starter/generator (DISG); an engine; a driveline disconnect clutch positioned in a driveline between the engine and the DISG; and a controller including executable non-transitory instructions for operating the DISG in a speed control mode in response to an engine start request, instructions for closing the driveline disconnect clutch to rotate the engine at a cranking speed, and instructions for at least partially ramping open the driveline disconnect clutch in response to an engine rotation based event. The hybrid vehicle driveline system includes where the engine rotation based event is a change in a state of a poppet valve. The hybrid vehicle driveline system includes where the engine rotation based event is a predetermined combustion event number since stop of engine rotation.

In some examples, the hybrid vehicle driveline system further comprises additional executable non-transitory instructions for fully closing the driveline disconnect clutch in response to engine speed being within a speed range of a driveline integrated starter generator speed. The hybrid vehicle driveline system includes where the engine based rotation event is anticipated based on activation of fuel delivery and spark to the engine. The hybrid vehicle driveline system further comprises at least partially closing the driveline disconnect clutch in response to an absence of engine acceleration after the engine based rotation event.

Figure 4:
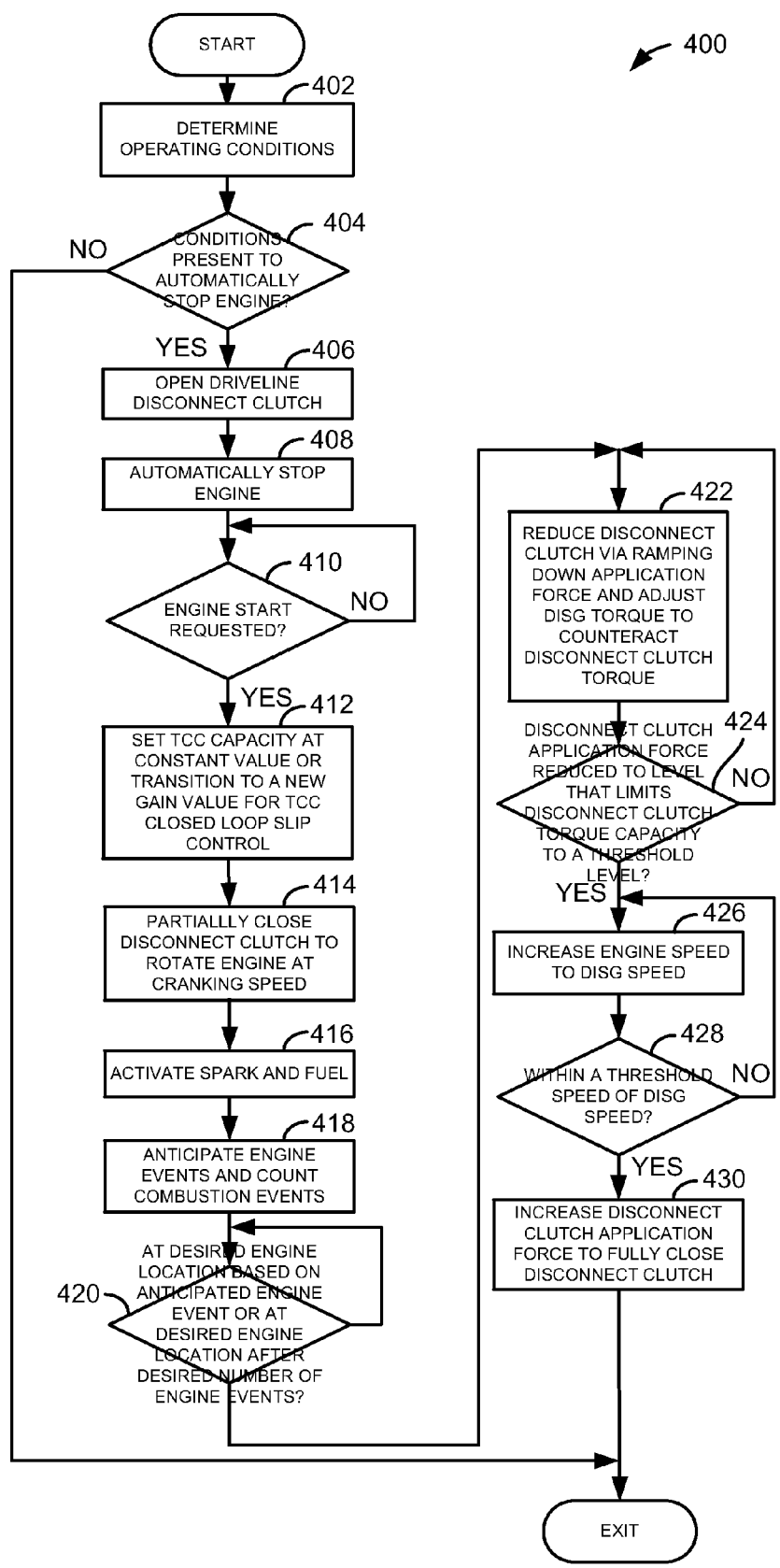
FIG. 4 shows a method for operating a vehicle that includes a driveline disconnect clutch.
Figure 5:
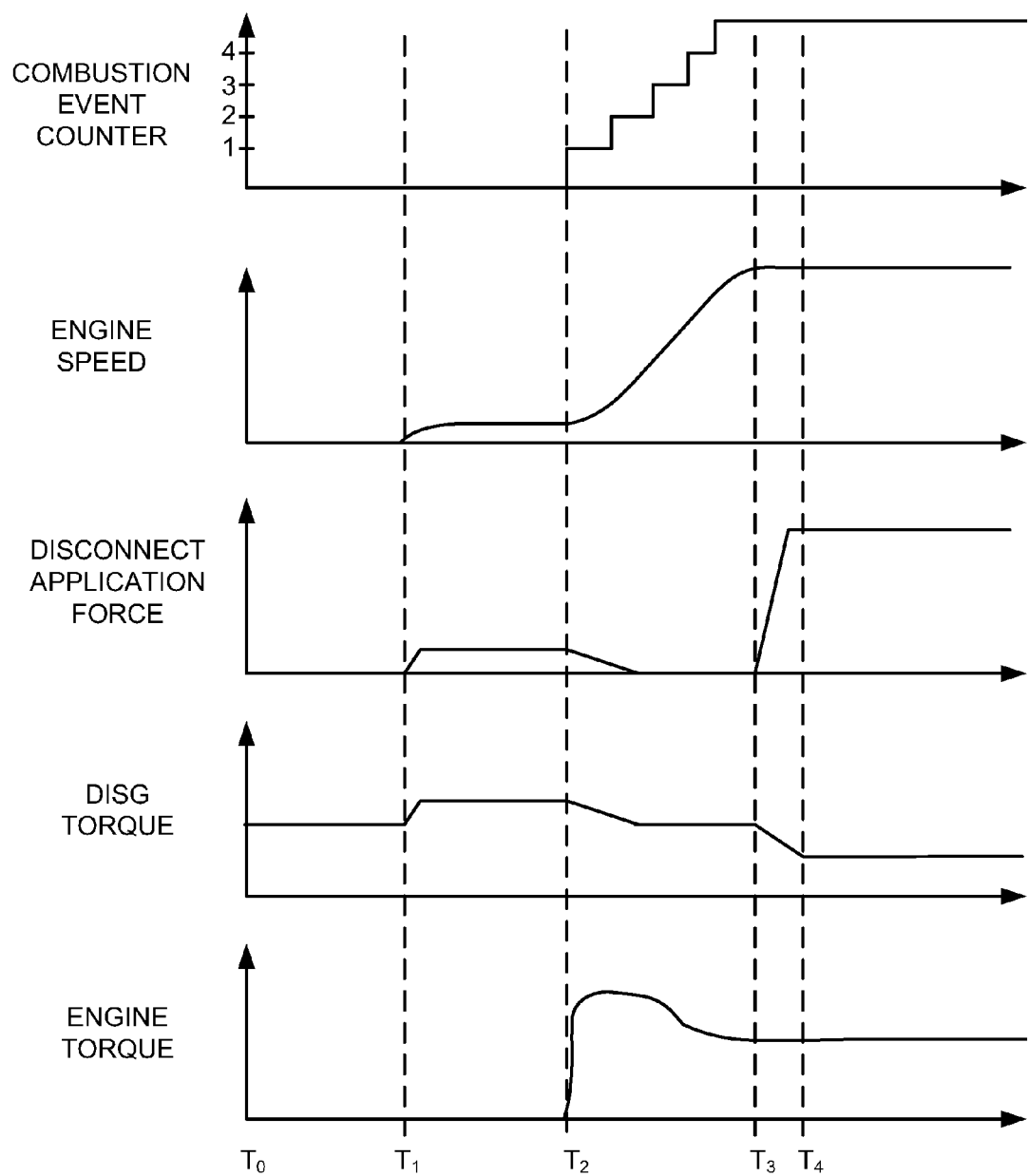
FIG. 5 shows a prophetic example sequence for operating a driveline according to the method of FIG. 4.

Referring now to FIG. 4, a flowchart of a method for starting a stopped engine via a driveline integrated starter generator is show. The method of FIG. 4 may be stored as executable instructions non-transitory memory in the system of FIGS. 1-3. Further, the method of FIG. 4 may provide the operating sequence shown in FIG. 5.

At 402, method 400 determines operating conditions. Operating conditions may include but are not limited to engine speed, accelerator pedal position, brake position, and vehicle speed. Method 400 proceeds to 404 after operating conditions are determined.

At 404, method 400 judges whether or not conditions are present to automatically stop the engine. The engine may be automatically stopped without the driver supplying input to a device that has a sole purpose of starting and/or stopping the engine (e.g., an engine stop/start switch). In one example, the engine may be automatically stopped when engine speed is less than a threshold speed, the vehicle is stopped, and the vehicle brake is applied. If method 400 judges that the conditions are present for automatically stopping the engine, the answer is yes and method 400 proceeds to 406. Otherwise, the answer is no and method 400 proceeds to 406.

At 406, method 400 opens the driveline disconnect clutch. The driveline disconnect clutch may be opened via allowing hydraulic fluid to enter or exit the driveline disconnect clutch. Alternatively, the driveline disconnect clutch may be opened via electrical power. Method 400 proceeds to 408 after the driveline disconnect clutch is opened.

At 408, method 400 automatically stops the engine. The engine may be automatically stopped via stopping fuel flow and/or spark to engine cylinders. Method 400 proceeds to 410 after the engine is automatically stopped.

At 410, method 400 judges whether or not a request to automatically start the engine is present. The engine may be automatically started in response to the drive releasing the brake pedal, applying the accelerator pedal, or other conditions. If a request to automatically start the engine is present, the answer is yes and method 400 proceeds to 412. Otherwise, the answer is no and method 400 returns to 410.

At 412, method 400 adjusts the torque converter clutch (TCC) capacity to a constant value or transitions to a new gain value for torque converter clutch closed loop slip control. By adjusting the torque converter clutch capacity to a constant value changes in torque available at the driveline disconnect clutch may be reduced. Method 400 proceeds to 414 after the torque converter clutch capacity is adjusted.

At 414, method 400 begins to partially close the driveline disconnect clutch to begin to rotate the engine for starting. The driveline disconnect clutch may be partially closed via an electric signal or it may be partially closed via allowing flow of hydraulic fluid to the driveline disconnect clutch. The driveline disconnect clutch application force increases in response to partially closing the driveline disconnect clutch. Method 400 proceeds to 416 after the driveline disconnect clutch is partially closed.

At 416, method 400 activates spark and fuel to the engine. By supplying spark and fuel to the engine, combustion may be initiated in the engine. Spark and fuel are activated to supply spark and fuel sequentially to engine cylinders based on engine position. Method 400 proceeds to 418 after spark and fuel are supplied to the engine.

At 418, method 400 anticipates one or more combustion events from engine stopping. In one example, combustion events are anticipated based on when spark and fuel is supplied to each engine cylinder. For example, if fuel is first supplied to cylinder number one during an intake and compression stroke of cylinder number one and spark is provided at a spark timing of five degrees before top-dead-center compression stroke, it may be determined that cylinder number one will be the first cylinder to combust an air-fuel mixture. In other examples, other engine cylinders may be the first cylinder to receive spark and fuel after engine stop. Similarly, if cylinder number four is the second cylinder to receive spark and fuel since engine stop, it may be judged to be the second cylinder to combust an air-fuel mixture since engine stop. In this way, combustion events may be anticipated in from one to N cylinders after engine stop.

In other examples, a combustion event or engine event (e.g., poppet valve closing or opening event, exhaust event, intake event, compression event, etc.) counter may be activated instead of or in addition to anticipating combustion events. The counter is incremented each time the selected event is anticipated to occur. For example, a combustion event counter starts at a value of zero and is incremented every engine combustion event since engine stop is anticipated to occur based on spark timing. Method 400 proceeds to 420 after engine events begin to be counted or after engine events begin to be anticipated.

At 420, method 400 judges whether or not the engine is at the desired anticipated or counted engine event or at a selected engine position after a desired number of engine events. Method 400 may judge that the engine is at the selected number combustion event or at the selected engine position after a selected number of engine events based on the engine event counter or based on the number of anticipated engine events. If method 400 judges that the engine is at the selected engine event or position after engine stop, the answer is yes and method 400 proceeds to 422. Otherwise, the answer is no and method 400 returns to 420.

At 422, method 400 begins to reduce the driveline disconnect clutch application force and at least partially open the driveline disconnect clutch. Further, method 400 adjusts the driveline DISG torque to counter act the reduction in driveline disconnect clutch force. In one example, the DISG torque is reduced as the driveline disconnect clutch application force is reduced so that the DISG does not accelerate. The driveline disconnect application force may be ramped to a lower application force. Method 400 proceeds to 424 after the driveline disconnect clutch application force is reduced.

At 424, method 400 judges whether or not the driveline disconnect clutch application force is reduced to a level that limits driveline disconnect clutch torque capacity (e.g., the amount of torque that may be transmitted via the driveline disconnect clutch at a selected driveline disconnect clutch application force) to a desired threshold level. The desired threshold value may be a value between zero an 50% of the driveline disconnect clutch's torque capacity when the driveline disconnect clutch is fully closed. Method 400 may judge that the driveline disconnect clutch application force is at the level where the driveline disconnect clutch is at the level that limits driveline disconnect clutch torque capacity to the desired threshold level, the answer is yes and method 400 proceeds to 426. Otherwise, the answer is no and method 400 returns to 422.

At 426, method 400 begins to increase engine speed to DISG speed. Engine speed is increased via continuing to supply spark and fuel to the engine. Additionally, the engine throttle opening amount may be increased to increase engine air flow. Method 400 proceeds to 428 after engine speed is increased.

At 428, method 400 judges whether or not engine speed is within a threshold speed of DISG speed. In one example, the engine speed may be determined to be within a threshold speed of DISG speed when engine speed is within ±50 RPM of DISG speed. If method 400 judges that engine speed is within a threshold speed of DISG speed, the answer is yes and method 400 proceeds to 430. Otherwise, the answer is no and method 400 returns to 426.

At 430, method 400 increases driveline disconnect clutch application force to fully close the driveline disconnect clutch. The driveline clutch application force may be increased via increasing flow of hydraulic fluid to the driveline disconnect clutch or via electrically engaging the driveline disconnect clutch. Method 400 proceeds to exit after the driveline disconnect clutch is closed.

In this way, operation of a driveline disconnect clutch may be adjusted to reduce the possibility of torque variation in a driveline. Thus, the driveline disconnect clutch may be partially closed to start the engine, partially opened to reduce torque exchange between the engine and the DISG, and closed when engine speed is near DISG speed so that engine torque may augment DISG torque.

Thus, the method of FIG. 4 provides for operating a hybrid vehicle driveline, comprising: automatically stopping an engine and opening a driveline disconnect clutch in response to an engine stop request; and automatically starting the engine in response to an engine start request, automatically starting the engine includes partially closing the driveline disconnect clutch to rotate the engine at a cranking speed and at least partially opening the driveline disconnect clutch in response to an combustion event. The method includes where the combustion event is a first combustion event since engine stop. The method further comprises counting a number of combustion events since engine stop.

In some examples, the method further comprises fully closing the driveline disconnect clutch in response to engine speed being within a range of a speed of a driveline integrated starter generator. The method includes where the range of speed begins at a speed below the speed of the driveline integrated starter generator. The method includes where the range of speed extends to a speed greater than the speed of the driveline integrated starter generator. The method includes where the combustion event is a combustion event that accelerates the engine, and where the combustion event is deemed to have occurred in response to a change in engine speed.

The method of FIG. 4 also provides for a method of operating a hybrid vehicle driveline, comprising: automatically stopping an engine and opening a driveline disconnect clutch in response to an engine stop request; and automatically starting the engine in response to an engine start request, automatically starting the engine includes partially closing the driveline disconnect clutch to rotate the engine at a cranking speed and at least partially opening the driveline disconnect clutch in response to an anticipated event. The method includes where the anticipated event is an event that is based on engine position and engine rotation. The method includes where the anticipated event is a change in state of a poppet valve of a cylinder.

In some examples, the method includes where the anticipated event is a cylinder combustion event. The method further comprises closing the driveline disconnect clutch in response to engine speed being within a speed range of a speed of a driveline integrated starter generator. The method includes where the engine is rotated at cranking speed via torque supplied by the driveline integrated starter generator. The method further comprises adjusting a torque converter clutch capacity to a constant value in response to the engine start request.

Referring now to FIG. 5, a prophetic driveline disconnect clutch operating sequence according to the method of FIG. 4 is shown. The sequence of FIG. 5 may be provided by the system of FIGS. 1-3 with the method of FIG. 4. Each of the plots of FIG. 5 occurs at the same time. Vertical markers T0-T4 represents times of particular interest in the sequence.

The first plot from the top of FIG. 5 is a plot of engine combustion events since engine stop versus time. The X axis represents time and time increases from the left side of FIG. 5 to the right side of FIG. 5. The Y axis represents engine combustion events and the number of engine combustion events increases in the direction of the Y axis arrow.

The second plot from the top of FIG. 5 is a plot of engine speed versus time. The X axis represents time and time increases from the left side of FIG. 5 to the right side of FIG. 5. The Y axis represents engine speed and engine speed increases in the direction of the Y axis arrow.

The third plot from the top of FIG. 5 is a plot of driveline disconnect clutch application force versus time. The X axis represents time and time increases from the left side of FIG. 5 to the right side of FIG. 5. The Y axis represents driveline disconnect clutch application force and the driveline disconnect clutch application force increases in the direction of the Y axis arrow.

The fourth plot from the top of FIG. 5 is a plot of DISG torque versus time. The X axis represents time and time increases from the left side of FIG. 5 to the right side of FIG. 5. The Y axis represents DISG torque and DISG torque increases in the direction of the Y axis arrow.

The fifth plot from the top of FIG. 5 is a plot of engine torque versus time. The X axis represents time and time increases from the left side of FIG. 5 to the right side of FIG. 5. The Y axis represents engine torque and engine torque increases in the direction of the Y axis arrow.

At time T0, the engine is stopped as indicated by the number of engine combustion events being zero and engine speed being zero. The driveline disconnect clutch is also open. The DISG torque is at a middle level and the DISG is providing torque to the vehicle driveline. Engine torque is zero since the engine is stopped.

At time T1, the driveline disconnect clutch application force is increased to increase the driveline disconnect clutch torque capacity in response to a request to start the engine (not shown). The DISG torque is increased in response to partially closing the driveline disconnect clutch. The DISG torque is increased by the same amount of torque increase in the driveline disconnect clutch torque capacity. The engine speed increases to engine cranking speed and engine torque output is zero.

Between time T1 and time T2, spark and fuel are supplied to the engine (not shown). The driveline disconnect clutch remains partially closed and the DISG torque remains at the elevated level so that torque is provided to rotate the engine while torque delivered to the vehicle wheels remains at a same level (not shown).

At time T2, the first engine combustion event occurs and the combustion event counter increments from zero to one. In alternative examples, other engine events may be counted and/or anticipated. The engine combustion events or engine events are tracked and are the basis for opening the driveline disconnect clutch.

Between time T2 and time T3, the number of engine combustion events increases and the engine continues to accelerate. In this example, the driveline disconnect clutch application force begins to decrease in response to the first engine combustion event so that a difference between engine speed and DISG speed results in a reduced torque change at the vehicle wheels as compared to if the driveline disconnect clutch is fully closed during engine starting. The DISG torque is also decreased by the torque amount the driveline disconnect clutch torque capacity is decreased. The engine torque also increases as combustion in the engine increases engine torque. In this example, the driveline disconnect clutch application force is reduced to a very low level, but the driveline disconnect clutch application force may be reduced to a lesser extent in other examples.

At time T3, the engine speed is within a threshold speed of DISG speed (not shown) and so the driveline disconnect clutch begins to close in response to engine speed being within a threshold speed of DISG speed. The DISG torque is reduced in response to the driveline disconnect clutch capacity and the amount of engine torque produced. The engine torque amount has stabilized to a constant value and the engine combustion counter has ceased to continue to increment since a limited count of engine combustion events is used to control driveline disconnect clutch application force.

At time T4, the driveline disconnect clutch is fully closed. By fully closing the driveline disconnect clutch, all available net engine torque is made available to the driveline. The DISG torque is reduced to a lower level so that the driver demand torque is supplied by the engine and the DISG. Engine torque and speed are at stabilized values.

In this way, driveline disconnect clutch application force may be increased and decreased during engine starting to reduce driveline torque disturbances during engine starting. Further, the timing that a driveline disconnect clutch is decreased may be based on a number of engine events since engine stop.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method of operating a hybrid vehicle driveline, comprising:
automatically stopping an engine and opening a driveline disconnect clutch in response to an engine stop request; and
automatically starting the engine in response to an engine start request, wherein automatically starting the engine includes partially closing the driveline disconnect clutch to rotate the engine at a cranking speed and at least partially opening the driveline disconnect clutch in response to a combustion event.

2. The method of claim 1, where the combustion event is a first combustion event since engine stop.

3. The method of claim 1, further comprising counting a number of combustion events since engine stop.

4. The method of claim 1, further comprising fully closing the driveline disconnect clutch in response to engine speed being within a range of a speed of a driveline integrated starter generator.

5. The method of claim 4, where the range of speed begins at a speed below the speed of the driveline integrated starter generator.

6. The method of claim 5, where the range of speed extends to a speed greater than the speed of the driveline integrated starter generator.

7. The method of claim 1, where the combustion event is a combustion event that accelerates the engine, and where the combustion event is deemed to have occurred in response to a change in engine speed.

8. A method of operating a hybrid vehicle driveline, comprising:
automatically stopping an engine and opening a driveline disconnect clutch in response to an engine stop request; and
automatically starting the engine in response to an engine start request, wherein automatically starting the engine includes partially closing the driveline disconnect clutch to rotate the engine at a cranking speed and at least partially opening the driveline disconnect clutch in response to an anticipated event.

9. The method of claim 8, where the anticipated event is an event that is based on engine position and engine rotation.

10. The method of claim 9, where the anticipated event is a change in state of a poppet valve of a cylinder.

11. The method of claim 9, where the anticipated event is a cylinder combustion event.

12. The method of claim 8, further comprising closing the driveline disconnect clutch in response to engine speed being within a speed range of a speed of a driveline integrated starter generator.

13. The method of claim 12, where the engine is rotated at the cranking speed via torque supplied by the driveline integrated starter generator.

14. The method of claim 8, further comprising adjusting a torque converter clutch capacity to a constant value in response to the engine start request.

15. A hybrid vehicle driveline system, comprising:
a torque converter;
a driveline integrated starter/generator (DISG);
an engine;
a driveline disconnect clutch positioned in a driveline between the engine and the DISG; and
a controller including executable non-transitory instructions for operating the DISG in a speed control mode in response to an engine start request, instructions for closing the driveline disconnect clutch to rotate the engine at a cranking speed, and instructions for at least partially ramping open the driveline disconnect clutch in response to an engine rotation based event.

16. The hybrid vehicle driveline system of claim 15, where the engine rotation based event is a change in a state of a poppet valve.

17. The hybrid vehicle driveline system of claim 15, where the engine rotation based event is a predetermined combustion event number since stop of engine rotation.

18. The hybrid vehicle driveline system of claim 15, further comprising additional executable non-transitory instructions for fully closing the driveline disconnect clutch in response to engine speed being within a speed range of a driveline integrated starter generator speed.

19. The hybrid vehicle driveline system of claim 15, where the engine rotation based event is anticipated based on activation of fuel delivery and spark to the engine.

20. The hybrid vehicle driveline system of claim 19, further comprising at least partially closing the driveline disconnect clutch in response to an absence of engine acceleration after the engine rotation based event.

* * * * *